US005955147A

United States Patent [19]

Serafin

[11] Patent Number: 5,955,147

[45] **Date of Patent: *Sep. 21, 1999**

[54] REFLECTIVE ALUMINUM TRIM

[75] Inventor: Daniel L. Serafin, Wexford, Pa.

[73] Assignee: Aluminum Company of America, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,061

[22] Filed: Feb. 26, 1996

Related U.S. Application Data

[63] Continuation-in-part of application No. 08/544,499, Oct. 18, 1995, Pat. No. 5,637,404, which is a continuation-in-part of application No. 08/184,311, Jan. 21, 1994, Pat. No. 5,478,414, which is a continuation-in-part of application No. 07/830,021, Jan. 31, 1992, Pat. No. 5,290,424.

[51] Int. Cl.$^{6}$ .......................... B32B 31/06; B32B 31/12; B32B 31/26

[52] U.S. Cl. .......................... 427/286; 427/287; 427/299; 427/327; 427/407.1; 427/409; 427/419.1; 156/200; 156/201; 156/202; 156/307.1; 156/327; 156/332; 428/195; 428/209; 428/421; 428/422

[58] Field of Search .................................... 428/334, 457, 428/650; 148/251, 247, 257; 156/272.6, 325, 201, 202, 200, 307.1, 332, 327; 427/532, 287, 286, 407.1, 409, 419.1

[56] References Cited

U.S. PATENT DOCUMENTS

| | | | |
|---|---|---|---|
| Re. 31,349 | 8/1983 | Smith et al. | 428/623 |
| 2,721,835 | 10/1955 | Axtell | 204/38 |
| 2,811,471 | 10/1957 | Homeyer, Jr. | 148/6.2 |
| 2,927,874 | 3/1960 | Pimbley | 148/6.27 |
| 3,530,048 | 9/1970 | Darrow | 204/33 |
| 3,542,605 | 11/1970 | Harvey, Jr. | 148/6.2 |
| 3,671,333 | 6/1972 | Mosier | 148/6.27 |
| 3,720,508 | 3/1973 | Brock et al. | 75/147 |
| 3,745,056 | 7/1973 | Jackson | 161/118 |
| 3,907,610 | 9/1975 | Yamagishi et al. | 148/6.2 |
| 3,915,811 | 10/1975 | Tremmel et al. | 204/33 |
| 3,929,537 | 12/1975 | Erwin | 156/86 |
| 3,945,899 | 3/1976 | Nikaido et al. | 204/181 |
| 3,989,876 | 11/1976 | Moji et al. | 428/472 |
| 4,003,760 | 1/1977 | Labenski et al. | 148/6.2 |
| 4,022,671 | 5/1977 | Asada | 204/42 |
| 4,025,681 | 5/1977 | Donnelly et al. | 428/116 |
| 4,085,012 | 4/1978 | Marceau et al. | 204/38 A |
| 4,131,489 | 12/1978 | Newhard, Jr. | 148/6.16 |
| 4,183,772 | 1/1980 | Davis | 148/6.16 |
| 4,183,915 | 1/1980 | Gaffar et al. | 424/52 |
| 4,298,440 | 11/1981 | Hood | 204/165 |

(List continued on next page.)

OTHER PUBLICATIONS

Stoneberg, Richard L., "Fluropolymer Finishes for Architectural Aluminum", PPG Industries, Inc. *Proceedings of Fifth International Aluminum Extrusion Technology Seminar*, vol. I, May 19–22, 1992.

*Primary Examiner*—Vivian Chen
*Attorney, Agent, or Firm*—Alan G. Towner; David W. Brownlee; Glenn E. Klepac

[57] ABSTRACT

Reflective aluminum trim for use in automobiles, trucks, boats and a variety of household and industrial appliances is produced by forming aluminum strip into a desired shape, followed by selective application of a fluoropolymer protective coating to only a partial portion of the show surface of the shaped strip and the application of a thermoplastic to the portions of the show surface not covered by the protective coating. The resulting trim piece has a highly reflective aluminum show surface which has a high distinctness of reflected image. The thermoplastic is preferably co-extruded onto the shaped aluminum strip using an adhesive to bond the thermoplastic directly to an un-coated portion of the aluminum surface. Prior to application of the thermoplastic, a single heating step may be used to cure both the protective coating and the adhesive.

30 Claims, 2 Drawing Sheets

U.S. PATENT DOCUMENTS 4,314,004 2/1982 Stoneberg ............................... 428/421
4,331,479 5/1982 Toyama ................................... 430/147
4,345,057 8/1982 Yamabe et al. ......................... 526/247
4,400,487 8/1983 Stoneberg et al. ...................... 525/199
4,483,750 11/1984 Powers et al. ............................ 204/29
4,490,184 12/1984 Forcht et al. .......................... 148/6.21
4,531,978 7/1985 Otrhalek et al. ....................... 148/6.16
4,601,796 7/1986 Powers et al. ............................ 204/33
4,624,752 11/1986 Arrowsmith et al. ................. 204/37.6
4,654,238 3/1987 Yamazaki et al. ........................ 428/31
4,681,668 7/1987 Davies et al. ............................. 204/28
4,737,246 4/1988 Powers et al. ............................ 204/58
4,865,903 9/1989 Adiletta ................................... 428/215
4,929,319 5/1990 Dinter et al. ............................ 204/164
5,035,940 7/1991 Winton et al. .......................... 428/174
5,131,987 7/1992 Nitowski et al. ....................... 205/201
5,204,147 4/1993 Schneider ............................... 428/35.8
5,290,424 3/1994 Mozelewski et al. .................. 205/116
5,478,414 12/1995 Mozelewski et al. .................. 148/265
5,531,841 7/1996 O'Melia et al. ........................ 148/265
5,637,404 6/1997 Bombalski et al. .................... 428/422
5,641,542 6/1997 Melzer et al. .......................... 427/302

REFLECTIVE ALUMINUM TRIM

CROSS-REFERENCE TO RELATED APPLICATIONS

This application is a continuation-in-part application of Ser. No. 08/544,499 filed Oct. 18, 1995, now U.S. Pat. No. 5,637,404, which is a continuation-in-part application of Ser. No. 08/184,311, filed Jan. 21, 1994, now U.S. Pat. No. 5,478,414, which is a continuation-in-part application of Ser. No. 07/830,021, filed Jan. 31, 1992, now U.S. Pat. No. 5,290,424.

BACKGROUND OF THE INVENTION

1. Field of the Invention

The present invention relates to a method of making highly reflective metal strips, and in particular to a method of making reflective aluminum trim for use in automobiles, trucks, boats and a variety of household and industrial appliances.

2. Background Information

Decorative trim is widely used in automobiles, trucks, boats and a variety of household and industrial appliances. Such decorative trim has conventionally been made from stainless steel due to its high reflectance, corrosion resistance and durability. However, the relatively high cost of stainless steel has prompted its replacement with aluminum trim. In addition to cost savings, the use of aluminum trim instead of stainless steel can result in weight savings for automobiles, trucks and the like.

U.S. Pat. No. 5,290,424, which is incorporated by reference herein, discloses a method of making shaped reflective aluminum strip protected by an anodic oxide coating and a light-permeable fluoropolymer coating. The method involves the steps of bright rolling aluminum alloy sheet, anodizing to prepare the surface of the sheet for subsequent coating, applying a fluoropolymer protective coating to the sheet, slitting the coated sheet to form strips, and roll forming the coated strips. After roll forming, adhesive is applied to the coated strips and then cured. A co-extrusion process is then used to apply a thermoplastic such as vinyl to the coated aluminum strips. While the disclosed method produces highly reflective aluminum trim with good durability, it is relatively expensive due to the large number of manufacturing steps involved. In addition, the fluoropolymer protective coating must be applied to the entire surface of the aluminum sheet instead of selected portions of the formed strips, which adds to the cost of the final product.

U.S. Pat. No. 5,478,414, which is incorporated by reference herein, discloses a method of making shaped reflective aluminum strip similar to the process disclosed in U.S. Pat. No. 5,290,424, except the surface cleaning and protective coating steps are combined into one operation. In this process, the aluminum alloy sheet is cleaned, chrome conversion coated, and roll coated with a fluoropolymer protective coating, all in one operation. The coated aluminum sheet is then slit to width and roll formed in a similar manner as disclosed in U.S. Pat. No. 5,290,424. A corona discharge is used to treat the coated strip prior to application of the adhesive.

U.S. Pat. No. 5,637,404 filed Oct. 18, 1995, which is incorporated by reference herein, discloses a method of making shaped reflective aluminum strip similar to that set forth in U.S. Pat. No. 5,478,414, with the exception that a chrome-free conversion coating is used and corona treatment is not necessary prior to application of the adhesive.

In each of the above-referenced disclosures, the fluoropolymer protective coating is applied to at least one entire side of the aluminum sheet, followed by slitting to width and subsequent roll forming. Since a large portion of the aluminum strip is subsequently covered with vinyl to form the final trim piece, the application of the fluoropolymer protective coating over the entire surface of the aluminum sheet represents an unnecessary expense. In addition, it is difficult to adhere vinyl to the fluoropolymer protective coating. Corona discharge treatments and/or specialized adhesives are thus preferably used to adhere the vinyl to the fluoropolymer coating. Furthermore, since the strips are roll formed after the fluoropolymer protective coating is applied, the protective coating must be able to withstand crazing, debonding and other deleterious effects of the forming operation, which may result in a final coating that has less than optimum hardness.

Despite the above-noted processes, a need still exists for producing low-cost reflective aluminum trim with a minimum number of manufacturing steps. The present invention addresses these needs as well as other deficiencies of the prior art.

SUMMARY OF THE INVENTION

The present invention provides a method of making reflective aluminum trim wherein substantially flat aluminum strip is formed into a desired shape, followed by application of a protective coating to a selected portion of the shaped strip. This processing sequence eliminates problems such as crazing and debonding of the protective coating associated with prior aluminum trim-forming processes.

In accordance with a preferred method, the protective coating is applied only to the show surface of the shaped aluminum strip, resulting in material cost savings. As used herein, the term “show surface” means the surface that is visible when the trim is installed, and which is not covered with thermoplastic. When the trim is installed part of the thermoplastic may be visible, but is not considered part of the show surface. The protective coating provides durability and weatherability to the aluminum show surface while not substantially degrading the highly reflective characteristics of the aluminum surface.

After the protective coating is applied, a thermoplastic material such as vinyl may be applied to the shaped aluminum strip, preferably on a selected portion of the surface which has not previously been covered by the protective coating. In this manner, the thermoplastic layer may be adhered directly to the aluminum surface, thereby avoiding difficulties associated with adhering the thermoplastic to the protective coating.

An object of the present invention is to provide an improved method of making reflective aluminum trim.

Another object of the present invention is to provide a method of making reflective aluminum trim including the steps of providing a substantially flat aluminum strip, forming the aluminum strip into a shaped strip, applying a protective coating to the shaped strip, and covering at least a portion of the shaped strip with a thermoplastic to form reflective aluminum trim having at least one aluminum show surface covered with the protective coating.

Another object of the present invention is to provide a method of making reflective aluminum trim including the steps of providing a substantially flat aluminum strip, forming the aluminum strip into a shaped strip having at least one bend radius along the length thereof, applying a protective coating over a selected portion of the shaped strip, and cutting the shaped strip into a plurality of trim pieces comprising at least one aluminum show surface covered with the protective coating.

Another object of the present invention is to provide reflective aluminum trim comprising a shaped aluminum strip, a protective coating covering a selected longitudinally extending portion of the shaped aluminum strip, and a thermoplastic layer covering another selected longitudinally extending portion of the shaped aluminum strip.

These and other objects of the present invention will become more readily understood by reference to the following detailed description.

DETAILED DESCRIPTION OF THE PREFERRED EMBODIMENTS

This invention relates generally to the production of a shaped aluminum article having highly reflective, mirror-like characteristics suitable for use as decorative trim in automobiles, trucks, boats, appliances and the like. As used herein, the term "highly reflective" means that the surface is characterized by a high distinctness of reflected image (D/I). For example, the distinctiveness of reflected image may be at least 50% and preferably at least 70%. More preferably, the distinctness of reflected image is at least 80%.

Figure 1:
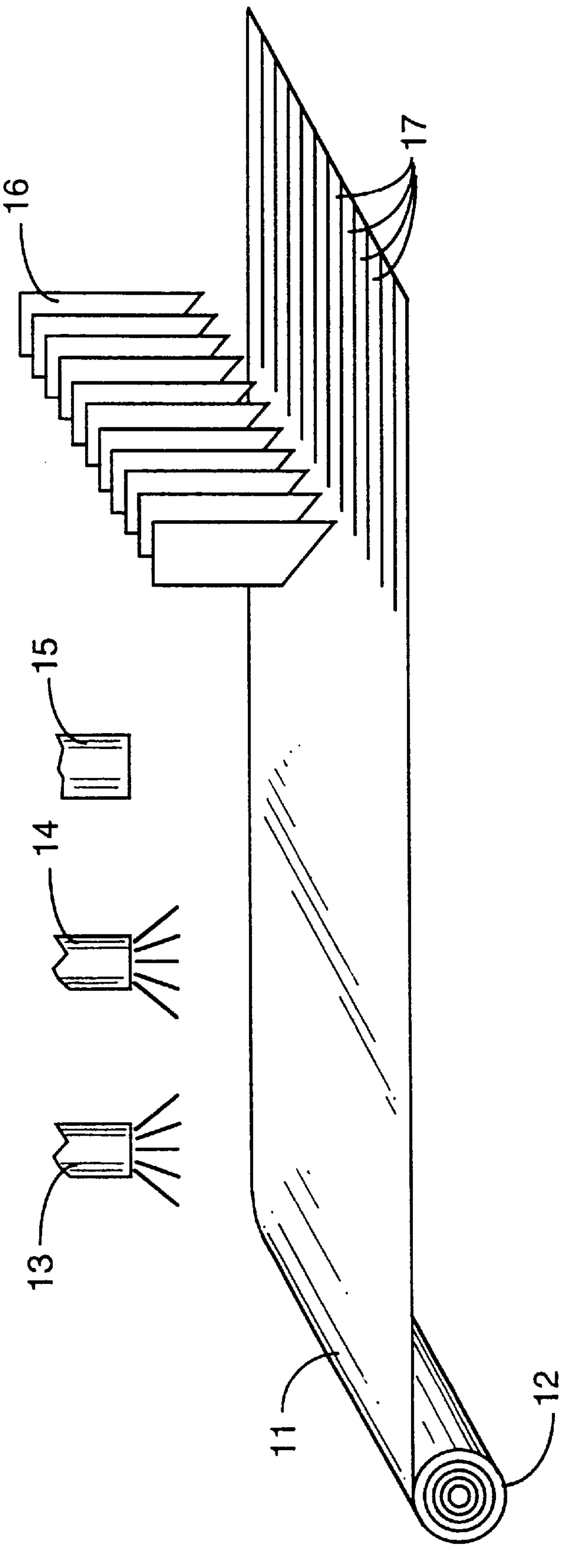
FIG. 1 PRIOR ART
FIG. 1 is a general schematic illustration of a prior art process for forming reflective aluminum strips wherein a fluoropolymer protective coating is applied to the entire surface of an aluminum sheet, followed by slitting of the aluminum sheet to form strips having the desired width. Such coated strips are then conventionally roll formed to provide shaped pieces which are subsequently partially covered with vinyl in a co-extrusion process to form the final trim piece.

Processes for fabricating decorative trim as disclosed in U.S. Pat. Nos. 5,290,424 and 5,478,414 and application Ser. No. 08/544,499 require the application of a fluoropolymer protective coating to the entire surface of an aluminum sheet, followed by cutting the sheet into strips and roll-forming the strips to the desired shape. FIG. 1 illustrates such a process wherein an aluminum sheet 11 is unrolled from a coil 12, conversion coated 13 and passed under a protective coating applicator 14 which applies the protective fluoropolymer coating. An oven 15 is then used to cure the protective fluoropolymer coating. Cutters 16 then slit the coated aluminum sheet 11 into strips 17. Although not shown in FIG. 1, the coated aluminum sheet is typically recoiled after the curing step, transported to another location and unwound before it is slit into strips. The resultant coated strips are then roll-formed to the desired shape and co-extruded with a thermoplastic to form the final decorative trim piece.

The term "strip" is used herein to specify a relatively narrow and thin sheet of aluminum or aluminum alloy in the range of from about 1 cm to about 1 m wide, preferably from about 2 cm to 30 cm wide, and from about 0.1 mm to about 5 mm thick, preferably from about 0.25 to about 1.25 mm thick.

While the process shown in FIG. 1 produces highly reflective aluminum trim with good durability, several processing steps are involved. Furthermore, since the fluoropolymer protective coating is applied prior to the roll-forming operation, the coating must be formulated to withstand the forming operation without crazing or debonding. Such formability requirements can result in a final coating with less than optimum durability and light transmittance characteristics. For example, forming constraints may require the protective coating to be relatively soft, which may reduce scratch and abrasion resistance in the final trim product.

Another disadvantage of the prior art process shown in FIG. 1 is the requirement for applying the protective coating over the entire surface of the aluminum sheet, including the surface areas which are subsequently covered by thermoplastic. Thus, the fluoropolymer coating is applied to areas where it is not needed. In addition to increased material costs, this application of fluoropolymer protective coating to more than just the show surface means that special treatments and/or adhesive compositions may be required in order to adhere the thermoplastic to the coated areas of the aluminum strip.

Figure 2:
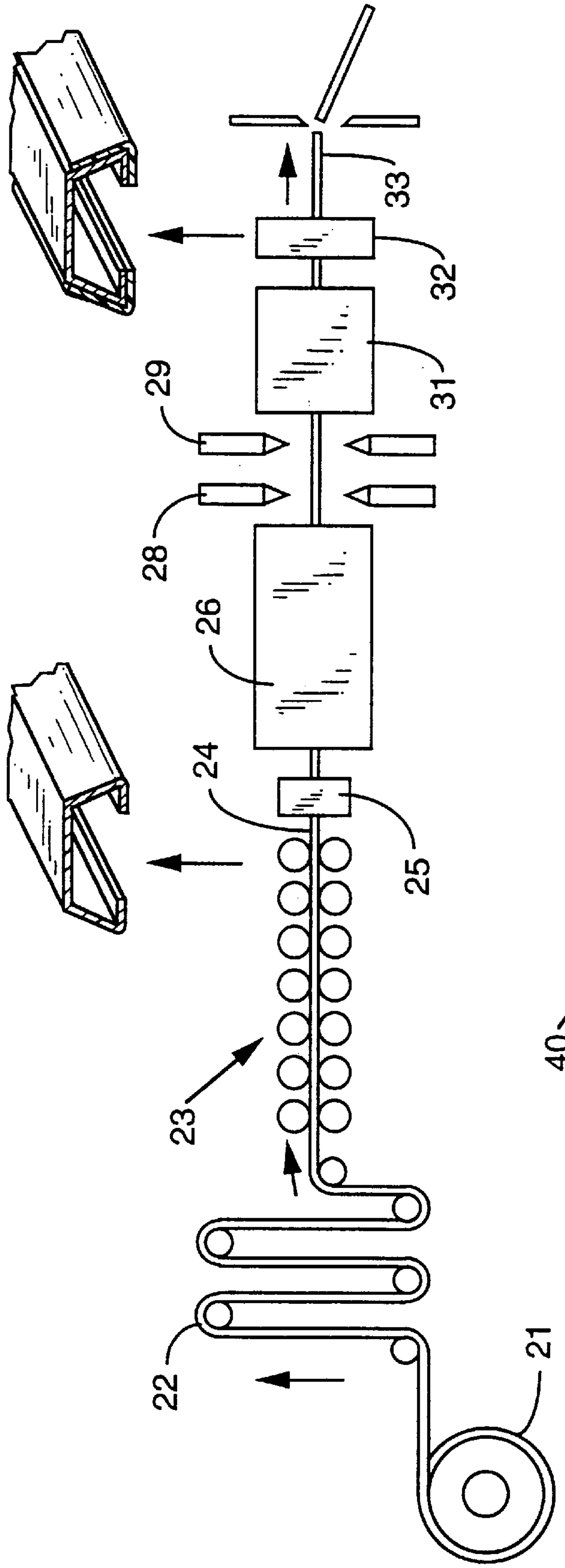
FIG. 2 is a schematic illustration of an aluminum trim-forming process in accordance with the present invention.

FIG. 2 schematically illustrates a process for forming aluminum trim in accordance with a preferred embodiment of the present invention. In this process, coiled aluminum strip 21, which preferably does not have a protective coating, is fed through an accumulator 22 into a roll former 23. The resultant shaped strip 24, which has at least one bend radius along the length of the strip, is then preferably fed through a straightening block 25 and into a cleaning tank 26. After the shaped strip is cleaned, it is preferably conversion coated and a protective coating applicator 28 applies a protective coating over a selected surface area of the strip, typically over a longitudinally extending portion of the strip. In a preferred embodiment, an adhesive applicator 29 applies adhesive over a selected longitudinally extending portion of the surface of the strip. The strip is then passed through an oven which cures the protective coating and the adhesive. In a preferred embodiment, a plastic extruder 32 is then used to form a thermoplastic layer over a selected portion of the shaped aluminum strip. The resultant co-extruded strip 33 is then cut to length.

In accordance with a preferred embodiment of the present invention, the protective coating is applied after the roll-forming operation and prior to the co-extrusion step. This sequence avoids the requirement of applying the protective coating over the entire surface of the aluminum sheet before the sheet is cut into strips. By eliminating the requirement that the protective coating be applied prior to the roll-forming operation, the properties of the final protective coating such as durability, hardness and clarity can be optimized, without the necessity of providing a coating that resists crazing, debonding and other deleterious effects of the roll forming operation. In addition, in accordance with a preferred embodiment of the present invention, the protective coating may be applied to only a selected portion of the formed aluminum strip, rather than the entire surface thereof. In this manner, the protective coating may be selectively applied only to the visible or show surface of the formed aluminum strip which is not subsequently covered with thermoplastic. This selective application of protective coating not only reduces the amount of coating required, but also results in improved adhesion of the thermoplastic to the non-show surface portions of the aluminum strip. Such a selective application of protective coating therefore eliminates the requirement of special treatments and/or special adhesive compositions previously required in order to adhere the thermoplastic to the coated aluminum strip.

In addition to the selective application of the protective coating, adhesive is also preferably applied to a selected portion of the aluminum strip which is subsequently covered with the thermoplastic layer during the co-extrusion step. This selective application of the protective coating to the show surface and selective application of the adhesive to the thermoplastic-covered surface allows the thermoplastic layer to be adhered directly to an uncoated aluminum surface during the co-extrusion process. Thus, in accordance with a preferred embodiment of the present invention, the final aluminum trim piece has a protective coating only on the aluminum show surface, and has at least one thermoplastic layer adhered directly to the aluminum surface of the shaped strip.

Figure 3:
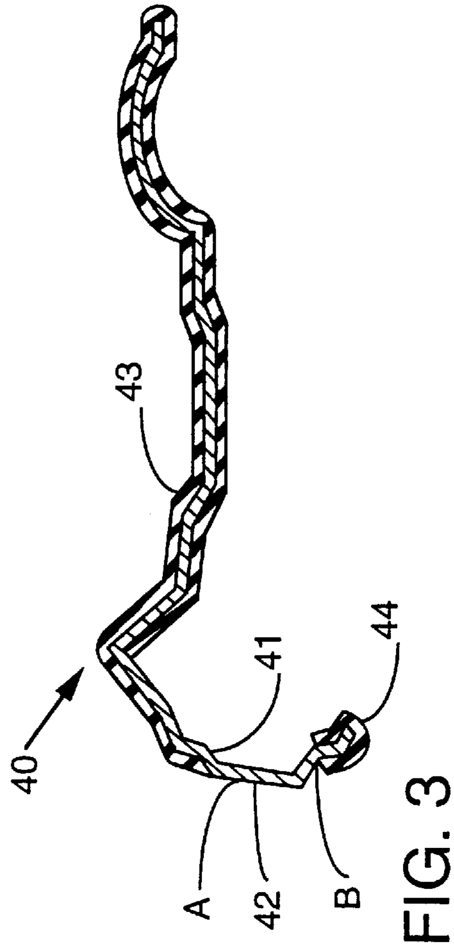
FIG. 3 is a cross-sectional view of an exemplary aluminum trim piece having an aluminum show surface. The trim piece is partially covered with vinyl in accordance with an embodiment of the present invention.

FIG. 3 illustrates a cross-section of an exemplary trim piece produced in accordance with the present invention. The trim piece 40 includes a shaped aluminum strip 41 having a show surface 42 which extends from point A to point B. Thermoplastic layers 43 and 44 cover portions of the shaped aluminum strip 41. In a typical application, such as automotive trim, the show surface 42 of the aluminum trim piece 40 would be visible when the trim is installed. In addition, in many applications, at least a portion of the thermoplastic layers may also be visible when the trim is installed. For many applications, only one side of the installed trim piece may be visible. For example, when a trim piece as shown in FIG. 3 is installed, the only visible aluminum surface may be the show surface 42 extending from point A to point B, with the opposite side of the shaped aluminum strip 41 being hidden from view. Much of the surface of the aluminum strip is therefore either concealed from view or covered with a thermoplastic layer.

In accordance with an alternative embodiment of the present invention, the protective coating is selectively applied to the show surface of the aluminum trim, without subsequent application of a thermoplastic layer. In this embodiment, the protective coating may be selectively applied over a longitudinally extending portion of the shaped strip comprising the show surface of the trim. Material cost savings are achieved by selectively applying the protective coating only to the show surface of the aluminum trim. In addition, since the protective coating is applied after the aluminum strip is formed into shape, problems such as crazing and debonding are avoided.

In accordance with the present invention, the composition of the aluminum strip is selected in order to provide the desired level of reflectivity. In addition to commercially pure aluminum, suitable alloys for use in accordance with the present invention including Aluminum Association 1XXX, 3XXX, 5XXX, 6XXX and 7XXX alloys such as 1050, 3002, 3003, 5182, 5252, 5552, 5657, 6306 and 7029.

In accordance with the present invention, the protective coating is substantially transparent such that it is preferably at least 80% permeable to visible light. The thickness of the protective coating may range from about 0.003 to 0.09 mm, more preferably from about 0.008 to about 0.025 mm. The protective coating is typically substantially colorless. However, in some applications the protective coating may be colored by dyes, pigments and the like. The protective coating is preferably selected such that it maintains the desired level of distinctness of reflected image of the aluminum show surface after exposure to alternating cycles of ultraviolet light and humid conditions for extended periods of time, commonly referred to as QUV/UVCON exposure as set forth in the 2500 hour SAE J2020 test. Thus, the protective coating preferably has sufficient weatherability, environmental durability and adhesion for automotive and marine uses.

The composition of the protective coating is selected in order to provide sufficient durability, weatherability, light permeability and hardness. Suitable protective coatings include fluoropolymers such as that sold by PPG under the name Dura Brite C. In addition to fluoropolymers, other types of protective coatings may be used such as polyurethanes, polyesters, acrylics, epoxies and enamels.

Preferred fluoropolymer protective coatings comprise a curable fluorocopolymer including 40 to 60 mol % fluoroolefin units, 5 to 45 mol % cyclohexyl vinyl ether units, 5 to 45 mol % alkyl vinyl ether units and 3 to 15 mol % hydroxalkyl vinyl ether units, the polymer having an inherent viscosity of 0.05 to 2.0 dl/g in tetrahydrofuran at 30° C. Such a fluoropolymer is disclosed in U.S. Pat. No. 4,345,057 to Yamabe et al., which is incorporated by reference herein. Commercially available fluoropolymers include those sold under the names ICI 302, ICI 504 and ICI 916.

The composition of the protective coating may be selected such that it can be applied directly to the bare or non-treated surface of the shaped aluminum strip, thereby avoiding the necessity of conversion coating or anodizing the aluminum prior to application of the protective coating. However, in some applications the shaped aluminum strip may be conversion coated and/or anodized prior to application of the protective coating in accordance with the present invention. For example, a conversion coating may be produced by immersing the shaped strip in a bath of Parker-Amchem® 401-45, Betz Metchem® Chrome Free 1904 at approximately 60–100° F. for 10–45 seconds, or Betz Metchem® Chrome Free 1903 at approximately 100–180° F. for 60–180 seconds, or Circle-Prosco® Chrome Free at approximately 70–100° F. for about 1–15 seconds. The conversion coating comprises a thin porous layer ranging in thickness from about 0.1 to 5 microns. The use of a conversion coating may provide increased grip for certain fluoropolymer protective coatings.

Suitable thermoplastics for use in accordance with the present invention include vinyls such as PVC, as well as other synthetic polymers, and rubber such as EPDM rubber. The following are among the commercially available thermoplastic materials (identified by standard symbols set forth in ASTM D4000) which may be applied to the shaped aluminum strip in accordance with the present invention: copolymers of styrene and/or a-methyl styrene and acrylonitrile such as copolymers of stryene and acrylonitrile (SAN); terpolymers of stryene, acrylonitrile and diene rubber (ABS); copolymers of stryene and acrylonitrile modified with acrylate elastomers (ASA); copolymers of stryene and acrylonitrile modified with ethylene propylene diene monomer (EPDM) rubber (ASE); polyvinyl chloride (PVC); chlorinated polyvinyl chloride (CPVC); siloxane cross-linked to form silicone rubber; nylon (a polyamide); polycarbonate (PC); thermoplastic polyesters (TPES), including polybutylene terephthalate (PBT), polyethylene terephthalate (PET), aromatic polyester and polyether-ester segmented copolymers; polyurethane (PUR); polyphenylene oxide (PPO); polyacetals (POM); copolymer of styrene and maleic anhydride (SMA); polymers of acrylic acid, methacrylic acid, acrylic esters, and methacrylic esters; polyolefins; polyamide-imide; polyacrylonitrile; polyarylsulfone; polyester-carbonate; polyetherimide; polyether-ketone (PEK); polyether-ether-ketone (PEEK); polyphenyl sulfide; and polysulfone.

Most preferred are the co-extrudable thermoplastic polymers such as PVC, CPVC, polyolefins, particularly grafted polypropylene, thermoplastic polyurethane, silicone rubber, PET and polysulfone. A specific polyvinyl chloride co-extrudate made from pigmented Geon PVC having a specific viscosity of at least 0.20, and an intrinsic viscosity in the range from 0.95 to 1.2, exhibits exceptional physical properties.

Where a thermoplastic layer is to be applied to the shaped aluminum strip, an adhesive may be used to adhere the thermoplastic to the aluminum surface. Preferred adhesives include acrylate-based adhesives such as those manufactured by BFGoodrich Company and sold under the designations BFG 1617 and BFG 1610. Another suitable acrylate-based adhesive is sold under the designation AO-420 by ITW. An additional adhesive is sold under the designation Chemlok 250 by Lord Corporation.

Referring to FIG. 2, substantially flat aluminum strip may be fed into a conventional roll former 23 in which progressive rolling dyes form the strip into the desired shape. The shaped strip typically includes at least one bend radius extending along the length thereof in the longitudinal direction.

After the aluminum strip is formed into the desired shape, it may be cleaned to remove lubricants and other contaminants by conventional means including the use of alkaline or acid cleaners which avoid excessive etching of the aluminum surface such as Novaclean 120LF sold by Novamax or Penwalt A40 sold by Penwalt.

After cleaning, the aluminum surface is preferably conversion coated or anodized by conventional techniques in order to provide increased grip for the protective coating. The protective coating may then be applied to the shaped strip by means such as spraying, rolling, sponging, curtain coating or the like. In order to apply the protective coating on a selected longitudinally extending portion of the shaped strip, application techniques such as rolling or the use of a sponge applicator pad are preferred.

After the protective coating is applied, it may be cured by heating or any other suitable method. The cure temperature is based upon the particular protective coating composition selected. For example, fluoropolymer protective coatings may be cured at a preferred temperature of from about 450–500° F.

The adhesive may be applied to the shaped aluminum strip by means such as spraying, rolling, sponging and curtain coating. In order to apply the adhesive to a selected longitudinally extending portion of the shaped strip, techniques such as rolling or the use of a sponge applicator pad are preferred. In accordance with a preferred embodiment of the present invention, the adhesive is applied to the shaped strip after the protective coating has been applied. The protective coating and adhesive are preferably cured at substantially the same time using a single heating operation. Thus, the compositions of the protective coating and adhesive may be selected such that they are capable of being cured at substantially the same temperatures. For example, a cure temperature of from about 450 to about 500° F. may be used to cure both a fluoropolymer protective coating and a BFG 1617 adhesive.

After application and curing of the protective coating and adhesive, at least one thermoplastic layer may be applied to the shaped strip. Conventional co-extruding techniques are preferably used to adhere the thermoplastic layer on the selected portion of the shaped strip. The term "co-extruding" is used herein to describe the process of extruding the thermoplastic onto the surface of the previously shaped aluminum strip. Co-extrusion may be performed in a commercially available roll-former such as one fitted with an extrusion die, for example, in a Tishken or Yoder Y-line roll-former.

The following examples are intended to illustrate various aspects of the present invention, and are not intended to limit the scope thereof.

EXAMPLE 1

A reflective aluminum trim piece is fabricated with a cross-section similar to that illustrated in FIG. 3. Coiled AA 5182 aluminum strip 5.0 cm wide and 0.5 mm thick is fed through an accumulator into a roll former where it is progressively formed into shape as shown in FIG. 3. The shaped strip is cleaned to remove lubricants and other contaminants introduced during the forming operation. The shaped strip is then conversion coated by a conventional spray application technique. A sponge pad is used to apply a protective coating along a selected longitudinally extending portion of the shaped strip corresponding to the show surface of the final trim piece. The protective coating comprises a fluoropolymer sold by PPG under the name Dura Brite C. Sponge pads are then used to apply adhesive to selected longitudinally extending portions of the shaped strip which have not been previously covered with the protective coating. The adhesive is an acrylate-based adhesive manufactured by BFGoodrich Company and sold under the designation BFG 1617. The shaped strip is passed through an oven to achieve a peak metal temperature between 450 and 500° F. to cure both the protective fluoropolymer coating and the adhesive. The shaped strip is then passed through a plastic extruder which applies a PVC thermoplastic against the adhesive-covered longitudinally extending portions of the aluminum strip. The resultant co-extruded strip is cut to length to form a trim piece comprising an aluminum show surface covered with the protective coating and thermoplastic layers adhered directly to selected surfaces of the aluminum strip. The coated aluminum show surface is highly reflective and exhibits a distinctness of reflected image of greater than 80%.

EXAMPLE 2

Example 1 is repeated except AA alloys 1050, 3002, 3003, 5252, 5552, 5657, 6306 and 7029 are used as the aluminum strip. Each trim piece comprises a highly reflective aluminum show surface having a distinctness of reflected image of greater than 80%.

EXAMPLE 3

Example 1 is repeated except no adhesive is applied to the aluminum strip and no thermoplastic layers are applied. The resultant aluminum trim piece comprises a show surface covered with the fluoropolymer protective coating having a distinctness of reflected image greater than 80%.

EXAMPLE 4

Example 1 is repeated except no conversion coating is applied to the shaped strip, and a polyurethane protective coating is used rather than a fluoropolymer protective coating. The resultant trim piece comprises a reflective aluminum show surface having a distinctness of reflected image greater than 80%.

It is to be understood that the above description of the present invention is capable of many changes, modifications and adaptations by those skilled in the art, and that such modifications, changes and adaptations are to be considered within the scope of the invention, as set forth by the following claims.

I claim:

1. A method of making reflective aluminum trim comprising:

providing a substantially flat aluminum strip having a surface;

forming the aluminum strip into a shaped strip;

applying a protective coating comprising a fluoropolymer to a selected portion of the surface of the shaped strip, said selected portion comprising less than the entirety of said surface; and covering a portion of the shaped strip with a thermoplastic selected from the group consisting of copolymers of styrene and acrylonitrile (SAN); terpolymers of styrene, acrylonitrile, and diene rubber (ABS); copolymers of styrene and acrylonitrile modified with acrylate elastomers (ASA); copolymers of styrene and acrylonitrile modified with ethylene propylene diene monomer (EPDM) rubber (ASE); polyvinyl chloride (PVC); chlorinated polyvinyl chloride (CPVC); siloxane cross-linked to form silicone rubber; nylon; polycarbonate (PC); polybutylene terephthalate (PBT); polyethylene terephthalate (PET); aromatic polyesters; polyether-ester segmented copolymers; polyurethane (PUR); polyphenylene oxide (PPO); polyacetals (POM); copolymer of styrene and maleic anyhydride (SMA); polymers of acrylic acid, methacrylic acid, acrylic esters, and methacrylic esters; polyolefins; polyamide-imide; polyacrylonitrile; polyarylsulfone; polyestercarbonate; polyetherimide; polyether-ketone (PEK); polyether-ether-ketone (PEEK); polyphenyl sulfide; and polysulfone, thereby to form reflective aluminum trim having at least one show surface comprising an aluminum surface covered with the protective coating and not covered by said thermoplastic, and a layer of said thermoplastic adhered directly to the aluminum surface.

2. The method of claim 1, wherein the protective coating is applied to a substantially uncoated surface of the shaped strip.

3. The method of claim 1, wherein the substantially flat aluminum strip comprises an aluminum alloy selected from the group consisting of Aluminum Association 1XXX, 3XXX, 5XXX, 6XXX and 7XXX alloys.

4. The method of claim 3, wherein the aluminum alloy is selected from Aluminum Association alloys 1050, 3002, 3003, 5182, 5252, 5552, 5657, 6306 and 7029.

5. The method of claim 1, wherein the aluminum strip is formed into the shaped strip by roll forming to thereby form at least one bend radius along the length of the strip.

6. The method of claim 1, wherein the protective coating is applied to the shaped strip by rolling.

7. The method of claim 1, wherein the protective coating is cured prior to covering the shaped strip with the thermoplastic.

8. The method of claim 1, wherein the protective coating comprises a light permeable fluoropolymer.

9. The method of claim 1, wherein the protective coating is applied only to the show surface of the aluminum trim.

10. The method of claim 1, wherein the shaped strip is conversion coated prior to applying the protective coating.

11. The method of claim 1, wherein the shaped strip is anodized prior to applying the protective coating.

12. The method of claim 1, wherein the shaped strip is covered with thermoplastic by co-extruding the shaped strip and the thermoplastic.

13. The method of claim 1, wherein the thermoplastic comprises polyvinyl chloride (PVC).

14. The method of claim 1, further comprising applying adhesive to at least a portion of the shaped strip before the shaped strip is covered with the thermoplastic.

15. The method of claim 14, wherein the adhesive is cured before the shaped strip is covered with thermoplastic.

16. The method of claim 14, wherein the adhesive is applied only to a selected portion of the surface of the shaped strip which is subsequently covered with the thermoplastic.

17. The method of claim 14, wherein the adhesive comprises an acrylate-based adhesive.

18. The method of claim 14, wherein the protective coating is applied only to a first selected portion of the surface of the shaped strip and the adhesive is applied only to a second selected portion of the surface of the shaped strip.

19. The method of claim 18, wherein the first and second selected portions of the surface of the shaped strip do not overlap.

20. The method of claim 18, wherein the protective coating and adhesive are cured before the shaped strip is covered with the thermoplastic.

21. The method of claim 20, wherein the protective coating and adhesive are cured by heating the protective coating and the adhesive at substantially the same time.

22. The method of claim 21, wherein the protective coating and the adhesive are heated to a temperature of from about 450 to about 500° F.

23. The method of claim 1, further comprising cutting the reflective aluminum strip to length after the shaped strip is covered with the thermoplastic.

24. The method of claim 23, further comprising bending the length of reflective aluminum trim to form a curved trim piece.

25. A method of making reflective aluminum trim comprising:

providing a substantially flat aluminum strip having a surface;

forming the aluminum strip into a shaped strip having at least one bend radius along the length thereof;

applying a fluoropolymer protective coating over a selected first portion of the surface of the shaped strip, said selected portion comprising less than the entirety of said surface;

covering a second portion of the surface of the shaped strip with a thermoplastic selected from the group consisting of copolymers of styrene and acrylonitrile (SAN); terpolymers of styrene, acrylonitrile, and diene rubber (ABS); copolymers of styrene and acrylonitrile modified with acrylate elastomers (ASA); copolymers of styrene and acrylonitrile modified with ethylene propylene diene monomer (EPDM) rubber (ASE); polyvinyl chloride (PVC); chlorinated polyvinyl chloride (CPVC); siloxane cross-linked to form silicone rubber; nylon; polycarbonate (PC); polybutylene terephthalate (PBT); polyethylene terephthalate (PET); aromatic polyesters; polyetherester segmented copolymers; polyurethane (PUR); polyphenylene oxide (PPO); polyacetals (POM); copolymer of styrene and maleic anyhydride (SMA); polymers of acrylic acid, methacrylic acid, acrylic esters, and methacrylic esters; polyolefins; polyamide-imide; polyacrylonitrile; polyarylsulfone; polyester-carbonate; polyetherimide; polyether-ketone (PEK); polyether-ether-ketone (PEEK); polyphenyl sulfide; and polysulfone; and cutting the shaped strip into a plurality of trim pieces comprising at least one aluminum show surface covered with the protective coating and not covered by said thermoplastic.

26. The method of claim 25, further comprising applying adhesive on a selected longitudinally extending portion of the shaped strip; and applying said thermoplastic against the adhesive to bond the thermoplastic on the shaped strip.

27. The method of claim 26, wherein the adhesive is applied only to the portion of the shaped strip to which the thermoplastic is subsequently applied.

28. The method of claim 26, wherein the protective coating is applied to the shaped strip before the adhesive is applied to the shaped strip, and the protective coating and adhesive are cured simultaneously by passing the shaped strip through a heating means.

29. The method of claim 25, wherein the show surface of the reflective aluminum trim has a distinctness of reflected image of at least 80%.

30. The method of claim 25, wherein the substantially flat aluminum strip has a thickness of from about 0.01 inch to about 0.05 inch.

* * * * *